United States Patent [19]

Meijer et al.

[11] Patent Number: 5,311,188
[45] Date of Patent: May 10, 1994

[54] RADAR APPARATUS PROVIDED WITH A COHERENT CLUTTER MAP

[75] Inventors: Wietze J. H. Meijer, Enschede; Petrus N. C. Nooy, Hengelo, both of Netherlands

[73] Assignee: Hollandse Signaalapparaten B.V., Hengelo, Netherlands

[21] Appl. No.: 991,588

[22] Filed: Dec. 16, 1992

[30] Foreign Application Priority Data

Dec. 19, 1991 [NL] Netherlands ............ 9102125

[51] Int. Cl.$^5$ .............................................. G01S 13/50
[52] U.S. Cl. ........................................ 342/90; 342/160
[58] Field of Search ....................................... 342/90, 160

[56] References Cited

U.S. PATENT DOCUMENTS

| | | | |
|---|---|---|---|
| 4,217,583 | 8/1980 | Hiller et al. | 342/160 |
| 4,222,050 | 9/1980 | Kiuchi et al. | 342/160 |
| 5,049,889 | 9/1991 | Hol et al. | 342/160 |
| 5,070,335 | 12/1991 | Lewis et al. | 342/90 |

FOREIGN PATENT DOCUMENTS

| | | |
|---|---|---|
| 0044235 | 1/1982 | European Pat. Off. . |
| 0069415 | 1/1983 | European Pat. Off. . |
| 0188757 | 7/1986 | European Pat. Off. . |
| 2241077 | 3/1975 | France . |
| 2044034 | 10/1980 | United Kingdom . |

OTHER PUBLICATIONS

Proceedings of the International Conference Radar-82, Oct. 18-20, 1982, J. S. Bird, pp. 491-495, "Ground Clutter Suppression Using a Coherent Clutter Map."

*Primary Examiner*—Mark Hellner
*Attorney, Agent, or Firm*—Oblon, Spivak, McClelland, Maier & Neustadt

[57] ABSTRACT

A radar apparatus provided with transmitter means (1), rotating antenna means (2) and receiver means (3) for the transmission per burst and the processing in a video processor of radar echo signals. The video processor includes moving target detection unit (4) provided with a doppler filter bank, for instance an FFT processor, and slow moving target detection unit (6), provided with coherent clutter maps, one map for each radar transmitter frequency used. The coherent clutter maps are also used for reducing the clutter strength of radar echo signals which are applied to the moving target detection unit (4), by subtracting the coherent clutter strengths stored in the clutter maps from the radar echo signals.

12 Claims, 4 Drawing Sheets

RADAR APPARATUS PROVIDED WITH A COHERENT CLUTTER MAP

BACKGROUND OF THE INVENTION

The invention relates to a radar apparatus comprising antenna means, transmitter means connected to the antenna means, for generating and transmitting pulses, receiver means connected to the antenna means, for the reception, per transmitted pulse, of a radar echo signal, a video processor connected to the receiver means, comprising a slow moving target detection unit provided with a coherent clutter map divided into range-azimuth cells.

What are meant by slow moving targets are targets with radial speeds so low that they are not, on the basis of their speeds, discernable from clutter. What is meant by a coherent clutter map is a clutter map in which clutter information is stored as complex values, representing complex clutter strengths.

Such an apparatus is known from the report "Low Doppler target detection in ground clutter" by J. S. Bird, November 1985, Communications Research Centre, Ottawa, Canada. According to this report, a coherent clutter map will only serve a useful purpose when used in a non-moving antenna, such as a step-scan phased array antenna.

SUMMARY OF THE INVENTION

The present invention eliminates this drawback and is characterized in that the antenna means are mounted for rotation around an axis.

This is based on the inventive thought that it suffices to design the transmitter means such that radar transmissions take place in exactly the same directions, from scan to scan. To this end, the invention is further characterized in that the antenna means are provided with azimuth-values generating means for connection to the transmitter means. Moreover, it is characterized in that the transmitter means is provided with azimuth-values receiving control means for generating transmitter pulses at predetermined azimuth values.

An advantageous embodiment of the invention is characterized in that groups of N mutually coherent transmitter pulses are generated, such that a group will substantially coincide with an azimuth cell. This may render the radar apparatus suitable for the incorporation of a moving target detection unit provided with a doppler filter bank, for instance of FFT unit.

Another advantageous embodiment of the invention is characterized in that the control means generates consecutive groups with M (M=1, 2, 3, ...) different radar frequencies. It will then be required, however, to provide the slow moving target detection until with M coherent clutter maps, each map on a one-to-one basis added to each radar transmitter frequency.

If the radar apparatus comprises a moving target detection unit provided with a doppler filter bank, the information contained in the clutter maps may be used most inventively for substantially eliminating leakage, well-known in the art from the zero velocity filter into adjacent filters. The invention is thereto also characterized in that the video processor is provided with a subtracter circuit connected to the input of the moving target detection unit, for reduction of radar echoes supplied to the moving target detection unit by coherent clutter signals originating from the clutter map.

BRIEF DESCRIPTION OF THE DRAWINGS

The invention will be further explained with reference to the following figures, of which.

DETAILED DESCRIPTION OF THE INVENTION

Radar apparatuses are usually designed for observing moving objects, such as aircraft. For this purpose, they are provided with a moving target detection unit, in which radar echo signals originating from consecutive radar transmitter pulses are compared per range quant. In the event of a moving object, the phase of the echo signal in the range quant containing the target will continuously vary. These phase variations enable the detection of the object. A sophisticated moving target detection unit will in most cases be designed as a doppler filter bank operating in quadrature, which may be provided with an FFT-unit, which in fact determines the doppler frequency for a target.

In a radar apparatus provided with a moving target detection unit, a problem well-known in the art may occur for an aircraft flying tangentially, consequently at zero radial velocity. Without any additional measures, such an aircraft will disappear from the radar display, since consecutive echo signals always possess the same phase. In a search radar according to the state of the art, these additional measures involve the incorporation of a clutter map. This is a memory field divided into range-azimuth cells in which for each range-azimuth value in the associated range-azimuth cell the mean radar echo strength, obtained after a number of antenna rotations, is stored. This stored mean value, a scalar, represents the clutter strength. In each subsequent antenna rotation, the clutter strength is updated by means of a recursive filter. If a range-azimuth cell contains a target flying tangentially, or a hovering helicopter in a range-azimuth cell, the measured radar echo strength will generally increase. By continuously comparing the measured radar echo strength and the clutter strength, such a stationary or slow-moving target may nevertheless be detected.

For a radar apparatus provided with a rotating antenna, the clutter strength is stored as a scalar. Storage as a complex number, which would enable a comparison in quadrature of the measured radar echo strength and the clutter strength, is believed to operate unsatisfactory. The antenna movements cause objects to be measured slightly differently from scan to scan, so that a clutter cell has no constant phase. The amplitude is less affected by this; by determining the mean value of measured radar echo strengths in a clutter cell, it is therefore possible to realize a suitable system.

Figure 1A:
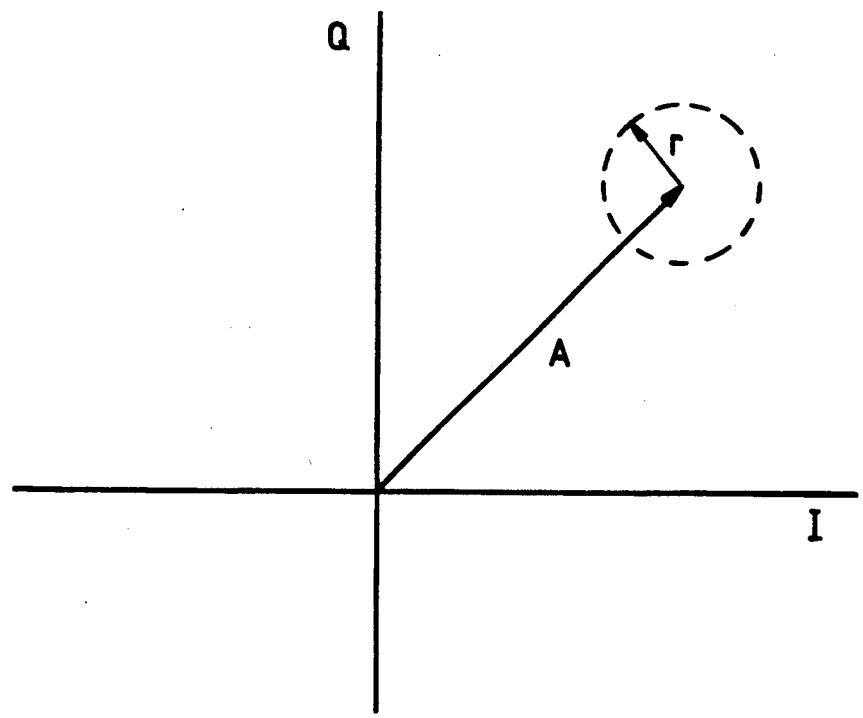
FIG. 1A shows a vector representation in the complex plane of a coherent clutter vector A and a spread modulus r.

In case of a step-scan phased array antenna, as in the report referred to in the introduction, it will be possible, though, to measure the clutter strength for each range-azimuth cell in quadrature. Clutter strengths thus measured have been found to be fairly constant for a prolonged period of time. Particularly strong echoes which may be produced by towers, blocks of flats or rock formations hardly vary in time. On the other hand, echoes produced by bushes will show far greater variations. In general, a model will be attained, in which a range-azimuth cell is provided with a complex clutter strength which is assumed to be substantially constant and a scalar spread modulus, which is a measure for the constancy of the clutter strength. This is illustrated in FIG. 1A, in which a vector A in the complex plane represents the complex clutter strength which is assumed to be practically constant, whereas spread modulus r defines a disc-shaped spread area in the complex plane surrounding the clutter strength. On the basis of consecutive measurements and statistical methods well-known in the art, the spread modulus r is selected such that the chance of new measurements coming within the disc-shaped area determined by r can be assessed in advance. The probability of non-occurrence of this event corresponds with a false-alarm probability per measurement defined for the radar apparatus.

Figure 1B:
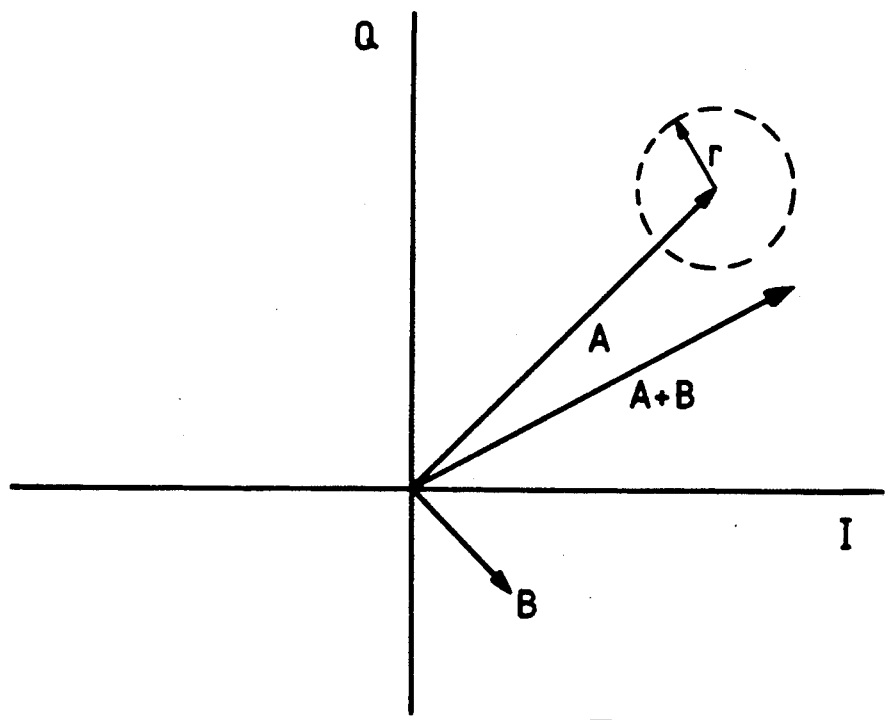
FIG. 1B shows a vector representation in the complex plane of a coherent clutter vector A plus a target vector B.

If a measurement indicates the presence of a new object in a certain range-azimuth cell, which object causes an echo characterized by vector B, FIG. 1B shows how the resulting vector A+B comes outside the disc-shaped area determined by r and will consequently yield a detection. It is noted that in a comparison based on a scalar clutter strength, this target would not have been detected since the value of modulus A+B does not exceed the modulus of A. In fact, the complex clutter strength always yields a better result than the scalar clutter strength, although this is particularly the case for strong clutter echoes having a low spread modulus r.

Figure 2:
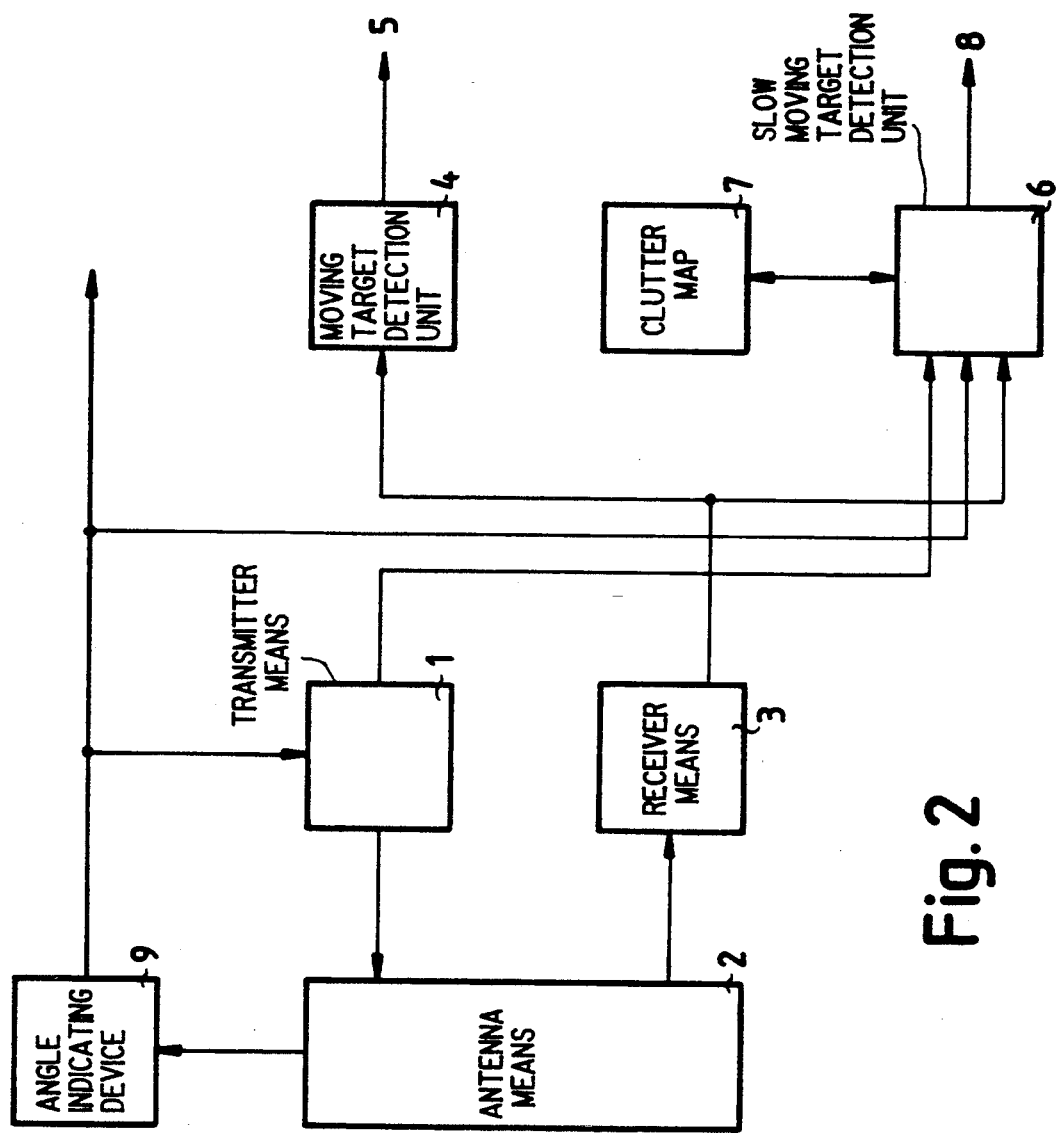
FIG. 2 shows a block diagram of the radar apparatus according to the invention.

FIG. 2 shows a block diagram of the radar apparatus according to the invention. Transmitter means 1 generate transmitter pulses which are transmitted by means of the rotating antenna means 2. Echo signals of transmitter pulses received by antenna means 2 are fed to receiver means 3 which apply the received and digitized echo signals to a moving target detection unit 4. Transmitter pulses are usually transmitted in bursts of N identical pulses, the moving target detection unit comprising an FFT processor for detecting comparatively fast moving targets, which detections can be presented via a first video output 5 for the tracking and display functions. Additionally, the echoes are applied to a slow moving target detection unit 6, which compares the echo strengths received in a range azimuth cell with a clutter strength stored in clutter map 7. Threshold crossings result in detections, presented via a second video output 8 for tracking and display functions. The N pulses in a burst are not required to be identical. Their relative coherence is sufficient. Receiver means 3 may then be arranged such that different transmitter pulses generate, as known in the prior art, identical radar echoes at the output of receiver means 3.

As known in the art, the antenna means 2 are equipped with an angle indicating device 9, which yields the antenna azimuth values for tracking and display purposes as well as with slow moving target detection unit 6 for addressing clutter map 7. In the radar apparatus according to the invention, the azimuth value is also presented to transmitter means 1. These means are such designed as to generate transmitter pulses on the basis of predetermined azimuth values. In a specific embodiment for example, the area of coverage of the radar apparatus is divided into 360 azimuth sectors of 1 degree and 4096 range quants of 160 m. Each time the azimuth value shifts one degree, one pulse may be transmitted, thus obtaining echoes for the slow moving target detection unit 6.

Alternatively each time the azimuth value shifts one degree, a burst of N mutually coherent pulses may be transmitted, N for instance corresponding to the number of points of an FFT unit in moving target detection unit 4. In this case the slow moving target detection unit 6 shall be arranged for the processing of a burst. The radar echo signals per range quant may be for example averaged over a burst with a weighted sum. This results in a reproducible coherent echo strength, in a substantial suppression of moving objects and in an improvement of the signal-to-noise ratio.

For several radar applications, it is required or advisable to use different radar transmitter frequencies. One may think in this respect, for example to the resolution of velocity ambiguities well-known in the art, or to a change in frequency in the event of jamming or interference. For a coherent clutter map a jump in frequency is disastrous, in that the stored values have little or no significance any longer. This may be solved by building a coherent clutter map for each radar transmitter frequency. To this end, the radar apparatus shall comprise a link to enable the transmitter means 1 to communicate to slow moving target detection unit 6 which radar transmitter frequency is employed. The link can also be used for the transfer of a sync signal for each transmitted radar pulse.

Figure 3:
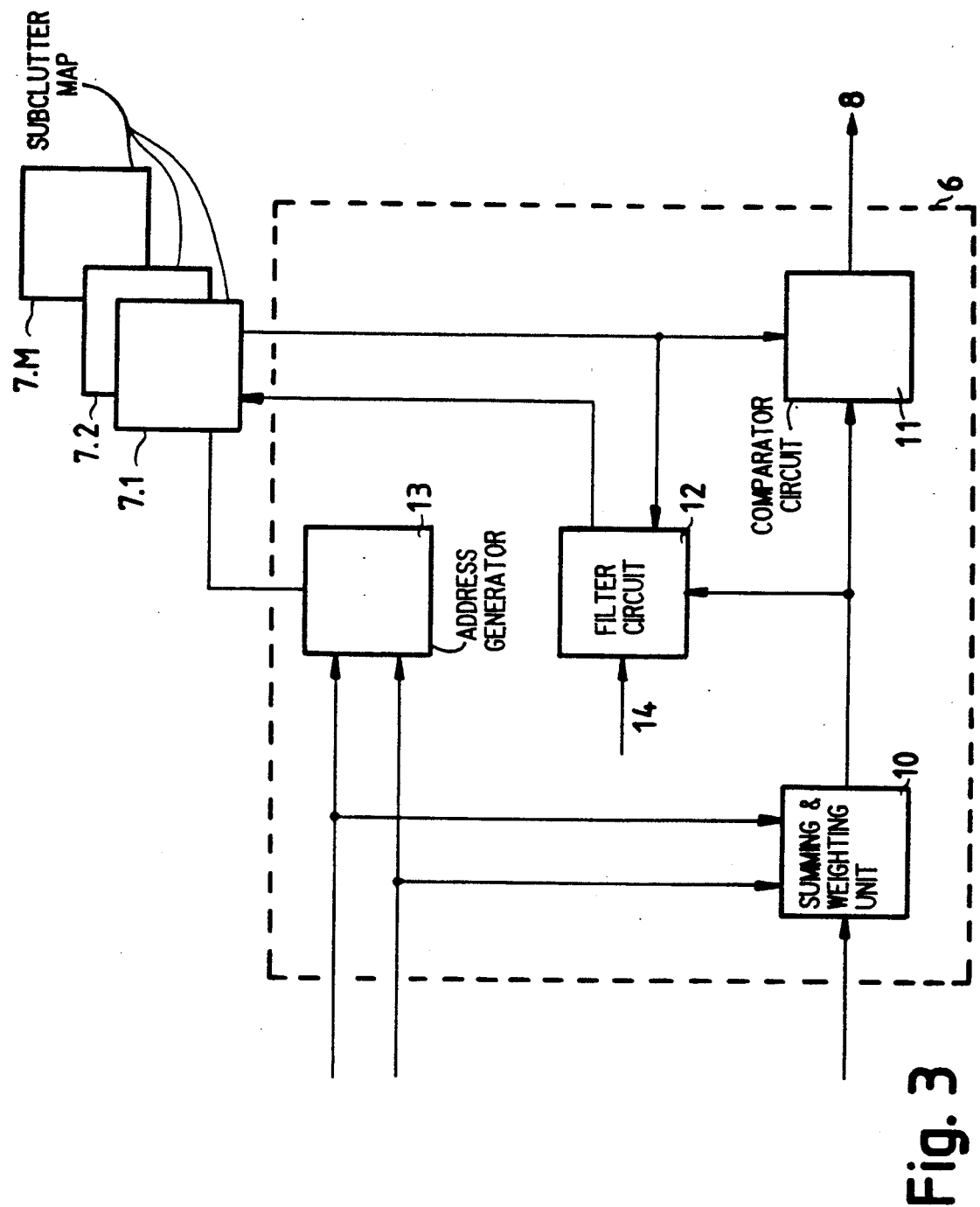
FIG. 3 represents a block diagram of the slow moving target detection unit according to the invention.

FIG. 3 presents a block diagram of the slow moving target detection unit 6 and clutter map 7, the latter possibly consisting of the subclutter maps 7.1, 7.2, ..., 7.M, one for each radar transmit frequency employed. Radar echoes which are received in an azimuth cell and which originate from a burst, are summed per range cell in a summing and weighting unit 10 provided with a weighting function, for instance a Hamming weighting. To this end, summing and weighting unit 10 receives, besides the radar echoes, azimuth information for establishing the start of a burst and the sync signal for each transmitted pulse. Echo strengths thus determined per range-azimuth cell are applied to a comparator circuit 11, to which the clutter strengths and spread moduli, associated with clutter map 7.i which is related to the relevant transmitter frequency i are presented. For each range-azimuth cell, comparator circuit 11 subtracts the clutter strength from the radar echo strength, determines the modulus of the difference and generates a detection via link 8, if this difference exceeds the spread modulus plus a possible additional threshold value in order to realize a predetermined false-alarm probability.

The complex echo strength determined by summing and weighting unit 10 is also applied to filter circuit 12, together with the associated complex clutter strength and the spread modulus. On the basis of the values supplied, filter circuit 12 determines, in a recursive process, new values for the clutter strength and the spread modulus, which are subsequently stored in clutter map 7.1. For the coherent clutter strength, use may be made of a filter according to the formula:

$$A_{N+1} = \alpha A_N + \beta S_{N+1} \tag{1}$$

where:
- $A_N$ is the clutter strength generated by the clutter map;
- $A_{N+1}$ is the new clutter strength to be stored in the clutter map;
- $S_{N+1}$ is the echo strength determined by the summing and weighting unit 10;
- $\alpha, \beta$ are filter coefficients (usually $\alpha+\beta=1$).

Depending on various system parameters, the scalar filter coefficients $\alpha, \beta$ are selected such that on the one hand, the filter run-in time is kept relatively short as a result of which the clutter map will contain relevant data within a relatively short period of time and that on the other hand, a stationary object dwelling within a range quant for some period of time will not be too quickly considered as clutter.

Similarly, for the spread modulus, a filter may be used according to the formula:

$$r_{N+1}^2 = \alpha' r_N^2 + \beta' |S_{N+1} - A_N|^2 \qquad (2)$$

where
- $r_N$ is the spread modulus generated by the clutter map;
- $r_{N+1}$ is the new spread modulus to be stored in the clutter map;
- $\alpha', \beta'$ are filter coefficients (usually $\alpha'+\beta'=1$).

Depending on various system parameters, the scalar filter coefficients $\alpha', \beta'$ are once again selected in such a way that on the one hand, the filter run-in time will be kept relatively short and that on the other hand, an occasional, sharply varying measurement will not too seriously disrupt the spread modulus.

For addressing clutter map 7, address generator 13 receives azimuth information from angle indicator 9, the sync signal and the radar transmitting frequency presently in use of transmitter means 1.

In the event of a plurality of radar transmitter frequencies being used, consequently a plurality of complex clutter maps being used, the regular use of each range-azimuth cell for each frequency, enabling the clutter strengths and spread moduli to be updated, is a precondition for the proper functioning of the radar apparatus. Measurements have shown clutter strengths and spread moduli measured by an earth-fixed radar apparatus under standard conditions to remain valid for at least five minutes. Within this period all range-azimuth cells for all frequencies have to be updated i.e. used.

The weighted sum determined in the summing and weighting unit 10 on the basis of the radar echoes, gives a certain degree of suppression for moving targets. Additional measures are nevertheless required to prevent moving targets from penetrating into the filter circuit 12 viz. summing and weighting unit 10, thereby modifying the contents of the clutter maps. These additional measures comprise an inhibit input 14 mounted on filter circuit 12, which is connected to output 5 of the moving target detection unit 4. This prevents a clutter strength being modified by a moving target from being stored in the clutter maps.

Figure 4:
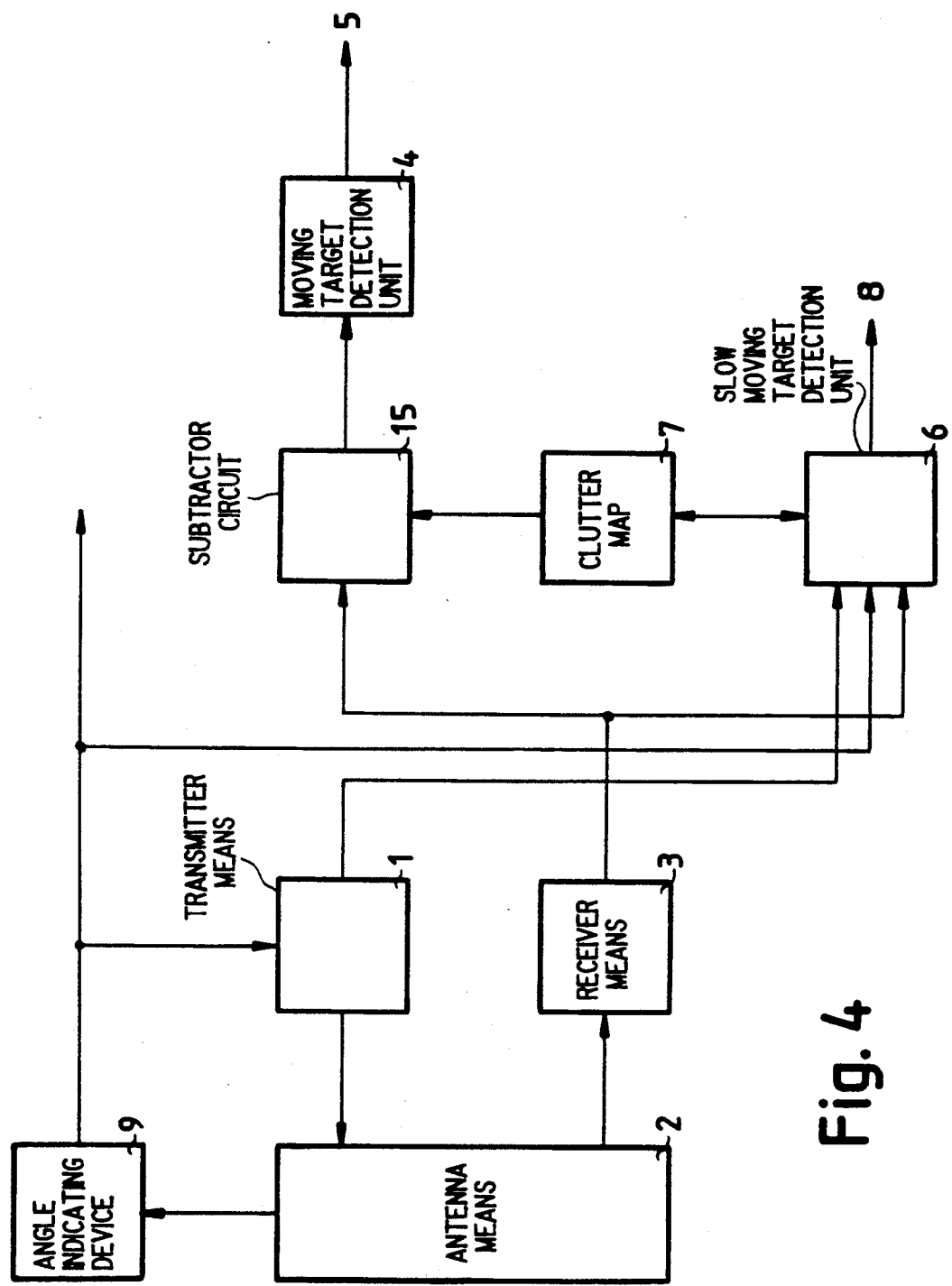
FIG. 4 represents a block diagram of a particularly advantageous embodiment of the radar apparatus according to the invention, the coherent clutter map also being used by the moving target detection unit.

A moving target detection unit processes the echoes of a burst by the application, per range quant, of a doppler filter process, for instance an N-point FFT. The output signals of the filters $-N/2, \ldots, -1, +1, \ldots, N/2-1$ are thresholded at the output of a doppler filter bank, and a threshold crossing yields a detection. The output of the zero velocity filter generates signals for clutter and is therefore not used. An problem well-known in the art is that extremely strong clutter echoes may unintentionally yield a threshold crossing in one of the other filters as a result of the usually non-optimal performance of a doppler filter. A most advantageous embodiment of the radar apparatus according to the invention obviates this problem by applying the coherent clutter strengths stored in the clutter maps. FIG. 4 shows how the received and digitized echo signals of a burst are applied to a subtracter circuit 15, each echo signal per range quant being reduced by the complex clutter strength stored for that range quant and the radar transmitter frequency used. Echo signals thus modified are applied to moving target detection unit 4. Subtraction of known strong clutter echoes prior to doppler filtering prevents the occurrence of the above-mentioned unintentional threshold passings. The threshold values applied may even be considerable lowered, as a result of which the sensitivity of the radar apparatus may increase.

We claim:

1. A radar apparatus comprising:
rotating antenna means;
transmitter means connected to said rotating antenna means for generating and transmitting radar pulses;
receiver means connected to said rotating antenna means for receiving, per transmitted pulse, a complex radar echo signal;
a video processor connected to said receiver means, said video processor comprising a slow moving target detection unit provided with a clutter map divided into range-azimuth cells, means for measuring and storing complex clutter strengths corresponding to each range-azimuth cell of said clutter map, and comparison circuits for comparing a received complex radar echo signal for each range-azimuth cell with the measured complex clutter strength stored in the corresponding range-azimuth cell of said clutter map.

2. A radar apparatus as claimed in claim 1, characterized in that said rotating antenna means is provided with azimuth-value generating means connected to said transmitter means.

3. A radar apparatus as claimed in claim 2, characterized in that said transmitter means is provided with azimuth-value receiving control means for generating transmitter pulses at predetermined azimuth values.

4. A radar apparatus as claimed in claim 3, characterized in that groups of N mutually coherent transmitter pulses are generated, such that each group will substantially coincide with a predetermined azimuth cell value, N being an integer.

5. A radar apparatus as claimed in claim 4, characterized in that said azimuth-value receiving control means generates consecutive groups of transmitter pulses having M different radar frequencies, M being an integer.

6. A radar apparatus as claimed in claim 5, characterized in that said slow moving target detection unit is provided with M coherent clutter maps, each map.

7. A radar apparatus as claimed in claim 6, characterized in that each of said range-azimuth cells contains at least one complex clutter strength and one spread modulus.

8. A radar apparatus as claimed in claim 7, characterized in that said video processor is provided with a first filter suitable for reading, modification and storage of clutter strengths, said modification comprising the determination of a new clutter strength from a previously stored clutter strength and from a weighted sum of radar echo signals originating from one burst of transmitter pulses.

9. A radar apparatus as claimed in claim 8, characterized in that said video processor is provided with a second filter suitable for reading, modification and storage of spread moduli, said modification comprising the determination of a new spread modulus from a previously stored spread modulus, from a clutter strength and from a weighted sum of radar echo signals originating from one burst of transmitter pulses.

10. A radar apparatus as claimed in claim 8 or 9, characterized in that said video processor further comprises a moving target detection unit provided with a doppler filter bank for the processing per group of received radar echo signals.

11. A radar apparatus as claimed in claim 10 characterized in that said first filter and said second filter are provided with inhibit inputs, connected to an output of said target detection unit.

12. A radar apparatus as claimed in claim 10, characterized in that said video processor is provided with a subtracter circuit connected to an input of said moving target detection unit, for reducing radar echoes supplied to said moving target detection unit through the use of coherent clutter signals originating from said clutter map.

* * * * *

UNITED STATES PATENT AND TRADEMARK OFFICE
CERTIFICATE OF CORRECTION

PATENT NO. : 5,311,188
DATED : May 10, 1994
INVENTOR(S) : Wietze J. H. Meijer et al It is certified that error appears in the above-indentified patent and that said Letters Patent is hereby corrected as shown below:

Column 6, line 3, claim 6, the end is missing. The words "being on a one-to-one basis added to each radar transmitter frequency" should be added.

Signed and Sealed this

Eighth Day of November, 1994

Attest:

BRUCE LEHMAN

Attesting Officer     Commissioner of Patents and Trademarks